L. FRIEDMAN AND D. WALLACE.
COLLAPSIBLE EXPANSION GASKET.
APPLICATION FILED MAR. 29, 1922.

1,427,099.

Patented Aug. 29, 1922.

WITNESSES
W. A. Williams.

INVENTORS
Loues Friedman
David Wallace
BY
ATTORNEYS

UNITED STATES PATENT OFFICE.

LOUES FRIEDMAN, OF MUNCIE, INDIANA, AND DAVID WALLACE, OF TULSA, OKLAHOMA.

COLLAPSIBLE EXPANSION GASKET.

1,427,099.   Specification of Letters Patent.   Patented Aug. 29, 1922.

Original application filed March 27, 1922, Serial No. 546,948. Divided and this application filed March 29, 1922. Serial No. 547,837.

*To all whom it may concern:*

Be it known that we, LOUES FRIEDMAN and DAVID WALLACE, citizens of the United States, and residents, respectively, of Muncie, in the county of Delaware and State of Indiana, and Tulsa, in the county of Tulsa and State of Oklahoma, have invented certain new and useful Improvements in Collapsible Expansion Gaskets, of which the following is a specification.

Our present invention relates generally to appliances for oil, gas or water wells and more particularly to a collapsible expansion gasket for use with flowing devices and capable as well of utilization for the various purposes for which gaskets or packers are at present employed, our object being the provision of a simple effective construction by virtue of which the gasket or packer is permitted to readily collapse on withdrawal from a well so as to eliminate trouble experienced in pulling or withdrawing the well packers now used and our present application being a division of our application Serial No. 546,948 which was filed March 27, 1922.

Figure 1:
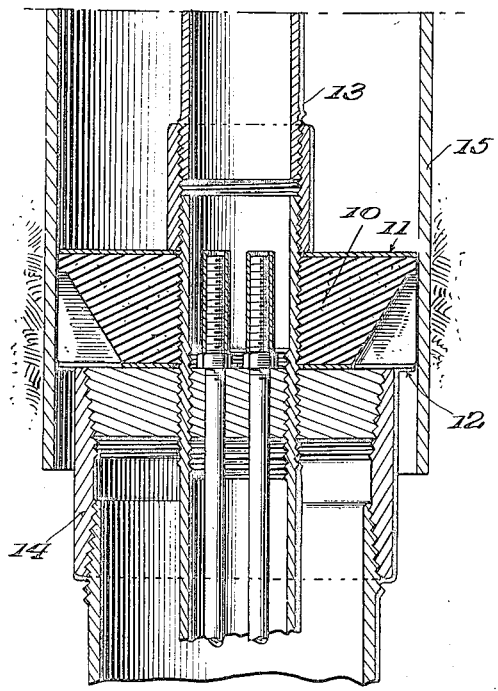
Figure 2:
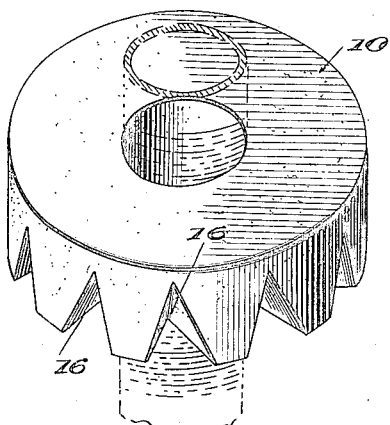
Figure 3:
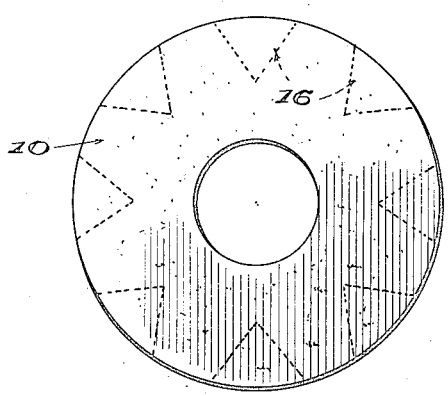

In the accompanying drawing which illustrates our present invention and forms a part of this specification, Figure 1 is a cross section through our improved collapsible expansion gasket illustrating the practical application of the same within a well casing, Figure 2 is a detail perspective view of our improved gasket removed, and Figure 3 is a top plan view thereof.

Referring now to these figures and particularly to Figure 1 we have shown our improved collapsible expansion gasket in one of its many uses as for instance to confine the natural gas in a well, or the gas or air forcibly introduced into the well, in order to force such natural gas or introduced gas or air to seep or flow through apertures intended for that purpose. Thus we have shown our improved collapsible expansion gasket 10, between washers 11 and 12 around a portion of an outflow line generally indicated at 13 and upon the upper end of a fluid and gas receiver 14 and in close uniform contact around its peripheral face with the internal surface of a well casing 15.

For the above purposes our improved collapsible expansion gasket is made in cylindrical form from a substantially soft rubber and has notches or recesses 16 therein which while permitting ready expansion, at the same time provides for easy and quick collapse when withdrawing the gasket in order to eliminate the usual trouble incident to pulling or withdrawing the ordinary oil well packer.

In the present instance, we have shown the gasket recessed by the cutting of an annular series of notches 16, the notches being upon its outer surface and extending partly into its peripheral face and partly into its lower side face, although the particular direction, number and extent of the recesses may of course be varied so long as their number, extent and direction permit of ready expansion and at the same time allow them to readily collapse sufficient to promote easy introduction into and removal from a well casing.

We claim:

1. A collapsible expansion gasket for disposition within, and ready removal from, well casings, consisting of an annular body formed of soft rubber, having recesses in its outer contact surface adapting it to readily yield when in closely interfitting relation within a well casing.

2. A collapsible expansion gasket for disposition within, and ready removal from, well casings, consisting of an annular body formed of relatively soft rubber, having recesses extending partially through its peripheral face and one side face, arranged in a series therearound to permit the same to readily yield when in closely interfitting relation within a well casing.

LOUES FRIEDMAN.
DAVID WALLACE.